G. B. LOCKEY AND A. F. LAWSON.
THREAD GAGE.
APPLICATION FILED FEB. 14, 1918.

1,337,018.

Patented Apr. 13, 1920.

INVENTOR
George B. Lockey
and Albret F. Lawson
By Kay Tolten Powell
attys

UNITED STATES PATENT OFFICE.

GEORGE B. LOCKEY AND ALBERT F. LAWSON, OF PITTSBURGH, PENNSYLVANIA.

THREAD-GAGE.

1,337,018.                Specification of Letters Patent.      Patented Apr. 13, 1920.

Application filed February 14, 1918.  Serial No. 217,216.

*To all whom it may concern:*

Be it known that we, GEORGE B. LOCKEY and ALBERT F. LAWSON, citizens of the United States, and residents of Pittsburgh, in the county of Allegheny and State of Pennsylvania, have invented a new and useful Improvement in Thread - Gages; and we do hereby declare the following to be a full, clear, and exact description thereof.

Our invention relates to a thread-gage for screws and taps.

The object of our invention is to provide a quickly-adjustable thread-gage by means of which the threads may be measured with the greatest accuracy down to thousandths of an inch, and one which is simple in construction and not liable to get out of order.

To these ends our invention comprises the novel features hereinafter set forth and claimed.

Figure 1:
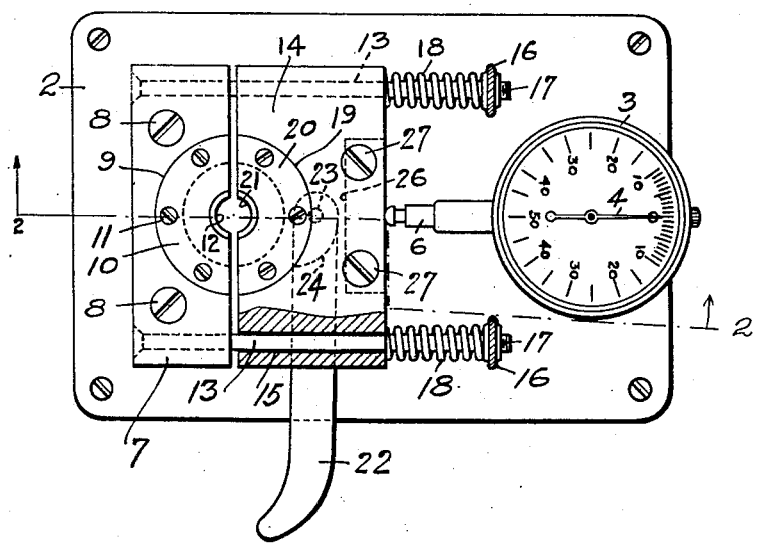
Figure 2:
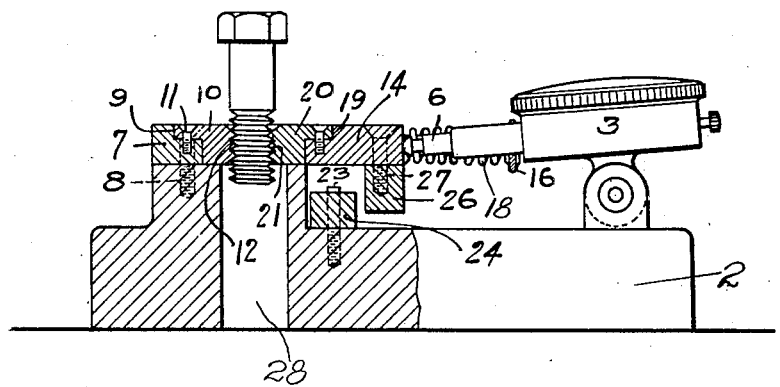

In the accompanying drawing, Figure 1 is a plan view partly in section of our improved gage; and Fig. 2 is a section on the line 2—2, Fig. 1.

In the drawing, the numeral 2 designates a base or support adapted to be secured to a bench or other support on which is mounted a suitable indicating-dial 3, which may be of the ordinary construction, said dial having the pointer 4, which normally registers at zero. The dial is knurled, and by turning same the zero point may be brought to register with the pointer 4. The dial-face is divided up into thousandths of an inch from each side of the zero point. Projecting from the dial is the movable arm 6 which by its inward and outward movement moves the indicating-finger or pointer 4.

Mounted on the base 2 is a stationary plate 7 which is secured to the base 2 by screws 8. The plate 7 is provided with the semi-circular countersunk opening 9 to receive the semi-circular hardened-steel gage-member 10, which is held in place on the plate 7 by means of screws 11. The gage-member 10 has the semi-circular threaded portion 12.

Connected to the plate 7 are the rods 13 which connect the plate 7 up with the movable plate 14, said rods passing through openings 15 in said movable plate and projecting beyond the same, and said rods being provided with the adjustable heads 16 engaging threads 17 on said rods. Springs 18 are interposed between the heads 16 and the movable plate 14, said springs acting to hold the plates 7 and 14 normally in contact with each other. The movable plate 14 is also provided with a semi-circular countersunk opening 19 to receive the semi-circular hardened-steel gage-member 20 corresponding to the gage-member 10, and said gage-member is further provided with the semi-circular threaded portion 21.

A lever 22 is provided for moving the movable plate 14, said lever being pivoted to the base 2 at 23, and having a cam 24 which is adapted to engage the abutment 26 secured by screws 27 to the movable plate 14.

In using our improved thread-gage for the measuring of threads of screws or taps, the gage is first set by a master-screw or tap, and for this purpose the lever 22 is moved to move the movable plate 14 to admit the master - screw being inserted between the gage-members 10 and 20. The insertion of this master-screw will separate the plate 14 from the plate 7, and consequently through the movable arm 6, the indicator or pointer 4 will be moved on the dial, whereupon the operator by turning the dial brings the indicator 4 back to zero. The master-screw is then removed and the screws to be measured are inserted one by one between the gages 10 and 20 by moving the movable plate 14 and then allowing the said plate to close in on the screw to be gaged. If the thread of the screw is exactly correct, the indicator-hand will point to zero, but if the thread is too large or too small, the indicator-hand will indicate any such discrepancy by its movement to the one side or other of the zero mark. In this manner we provide for a form of measuring device which, when having been properly set, will measure the threads with the greatest accuracy and can be operated by an unskilled person, the only requirement being to have someone who can properly read the dial and note the extent of movement of the indicator-hand. By starting a screw or tap one or two threads and then turning the dial to zero, the screw or tap may then be turned to the end,—the dial indicating the amount of taper in the thread.

By turning the screw a quarter or half turn when held between the gage-dies, any dirt formed or collected on the threads is removed and is permitted to drop down into the space 28, thus providing for the accurate reading of the pitch diameter on the dial.

What we claim is:

1. In a thread-gage, the combination with a suitable base or support, of an indicating dial, an operating-arm projecting out therefrom, a stationary member having a semi-circular threaded gage portion, a movable member spring actuated toward the stationary member and having semi-circular threaded gage portion registering with said first named member, the arm on said indicating dial having abutting engagement with said movable member, and means for moving said movable member away from said stationary member.

2. In a thread gage, the combination with a suitable base or support, of an indicating device, a stationary member having a semi-circular threaded gage portion, a movable member spring actuated toward the stationary member and having a semi-circular threaded gage portion registering with said first named member, a cam on said base engaging said movable member to move the same away from the stationary member, and an arm on said indicating device engaging said movable member.

3. In a thread gage, the combination with a suitable base or support, of an indicating device, a stationary member having a semi-circular threaded gage portion, a movable member spring actuated toward the stationary member and having a semi-circular threaded gage portion registering with said first named member, a cam-lever on said base engaging said movable member to move the same away from the stationary member, and an arm on said indicating device engaging said movable member.

In testimony whereof, we, the said GEORGE B. LOCKEY and ALBERT F. LAWSON, have hereunto set our hands.

GEORGE B. LOCKEY.
ALBERT F. LAWSON.

Witnesses:
ROBT. D. TOTTEN,
JOHN F. WILL.